United States Patent
Shaheen

(10) Patent No.: US 7,386,301 B2
(45) Date of Patent: *Jun. 10, 2008

(54) METHOD AND APPARATUS FOR MOBILE BASED ACCESS POINT NAME (APN) SELECTION

(75) Inventor: Kamel M. Shaheen, King of Prussia, PA (US)

(73) Assignee: InterDigital Technology Corporation, Wilmington, DE (US)

(*) Notice: Subject to any disclaimer, the term of this patent is extended or adjusted under 35 U.S.C. 154(b) by 235 days.

This patent is subject to a terminal disclaimer.

(21) Appl. No.: 11/228,619

(22) Filed: Sep. 16, 2005

(65) Prior Publication Data

US 2006/0013152 A1   Jan. 19, 2006

Related U.S. Application Data

(63) Continuation of application No. 10/321,331, filed on Dec. 17, 2002, now Pat. No. 6,970,694.

(60) Provisional application No. 60/399,593, filed on Jul. 30, 2002.

(51) Int. Cl.
*H04M 7/22* (2006.01)
*H04M 11/00* (2006.01)

(52) U.S. Cl. .................. 455/414.1; 455/422.1; 455/407

(58) Field of Classification Search .......... 455/414.1, 455/422.1, 407, 435.1, 435.2, 406, 408, 450; 370/328, 351–352, 392

See application file for complete search history.

(56) References Cited

U.S. PATENT DOCUMENTS

| | | | |
|---|---|---|---|
| 6,463,275 B1 | 10/2002 | Deakin | |
| 6,574,467 B1 | 6/2003 | Jonsson | |
| 6,636,491 B1 | 10/2003 | Kari et al. | |
| 6,970,690 B2 | 11/2005 | Yajima et al. | |
| 6,975,850 B1* | 12/2005 | Hurtta et al. | 455/405 |
| 2002/0062379 A1 | 5/2002 | Widegren et al. | |
| 2002/0068545 A1 | 6/2002 | Oyama et al. | |
| 2003/0103206 A1 | 6/2003 | Keller | |
| 2003/0103506 A1 | 6/2003 | Keller | |
| 2003/0119533 A1 | 6/2003 | Sarkkinen et al. | |
| 2004/0082346 A1 | 4/2004 | Skytt et al. | |
| 2004/0125755 A1* | 7/2004 | Roberts | 370/259 |
| 2004/0162105 A1* | 8/2004 | Reddy et al. | 455/551 |
| 2004/0192283 A1 | 9/2004 | Shaheen | |
| 2004/0193513 A1 | 9/2004 | Pruss et al. | |
| 2005/0101290 A1* | 5/2005 | Melgosa | 455/406 |

(Continued)

FOREIGN PATENT DOCUMENTS

JP    2001-508276    6/2001

(Continued)

*Primary Examiner*—Sonny Trinh
(74) *Attorney, Agent, or Firm*—Volpe and Koenig, P.C.

(57) ABSTRACT

A procedure is provided wherein a serving general packet radio service (GPRS) support node (SGSN) receives a request for an access point name (APN) the SGSN making a determination if the requested packet data protocol (PDP) and APN are the same as subscribed information. In the event that the requested and subscribed PDP type and the requested and subscribed APN are not the same, the SGSN advises that the APN requested is not authorized and agreement to terms and conditions and the provision of credit (or debit) card information must be provided to obtain the requested APN.

16 Claims, 4 Drawing Sheets

U.S. PATENT DOCUMENTS

2006/0013152 A1* 1/2006 Shaheen .................. 370/310

FOREIGN PATENT DOCUMENTS

| WO | 00/41401 | 7/2000 |
|----|----------|--------|
| WO | 01/39483 | 5/2001 |
| WO | 01/91445 | 11/2001 |
| WO | 01/95655 | 12/2001 |

* cited by examiner

METHOD AND APPARATUS FOR MOBILE BASED ACCESS POINT NAME (APN) SELECTION

CROSS REFERENCE TO RELATED APPLICATIONS

This application claims priority from U.S. provisional application No. 60/399,593 filed on Jul. 30, 2002, and non-provisional application Ser. No. 10/321,331 filed Dec. 17, 2002 now U.S. Pat. No. 6,970,694 which are incorporated by reference as if fully set forth.

FIELD OF INVENTION

The present invention relates to wireless communication systems. More particularly, the invention relates to method and apparatus for permitting access to an access point name (APN) not included within the subscribers list of services.

BACKGROUND

Existing standardized APN selection procedures will result in a denial of service (reject packet data protocol (PDP) Context activation procedures) in those cases where a mobile user has requested access to a certain APN not included within the list to which that user has subscribed.

SUMMARY

The present invention provides a procedure in which a user is given an opportunity to access any APN he wishes provided that the user is advised that he is not currently subscribed to this particular APN and that additional charges will be billed to his account. The user may also be requested to provide credit/debit card (or the like) information to cover access and future traffic charges. If the user agrees to the charges and/or provides credit/debit card information, i.e., payment information, a serving general packet radio service (GPRS) support node, i.e. (SGSN) selects the requested APN and proceeds to select the appropriate GGSN for the requested APN.

The present invention extends existing standardized APN selection procedures enabling a user to select a domain name (APN) of his choice, even though not among his subscription list, providing that the user consents/agrees to the applied charges for access and contents.

The technique of the present invention includes informing the user that he is attempting to access a domain name that he is not authorized to access. The procedure requests that a user confirm his intent to access such a domain by requesting financial verification which may be a credit/debit card, electronic check or the like, for billing access and traffic charges. Upon agreement and verification, the SGSN selects the requested APN and the appropriate gateway GPRS support node (GGSN) to facilitate the connection.

BRIEF DESCRIPTION OF THE DRAWINGS

The present invention will be understood from the accompanying description and drawings wherein like elements are designated by like numerals and, wherein.

DETAILED DESCRIPTION OF THE PREFERRED EMBODIMENT(S)

Figure 1:
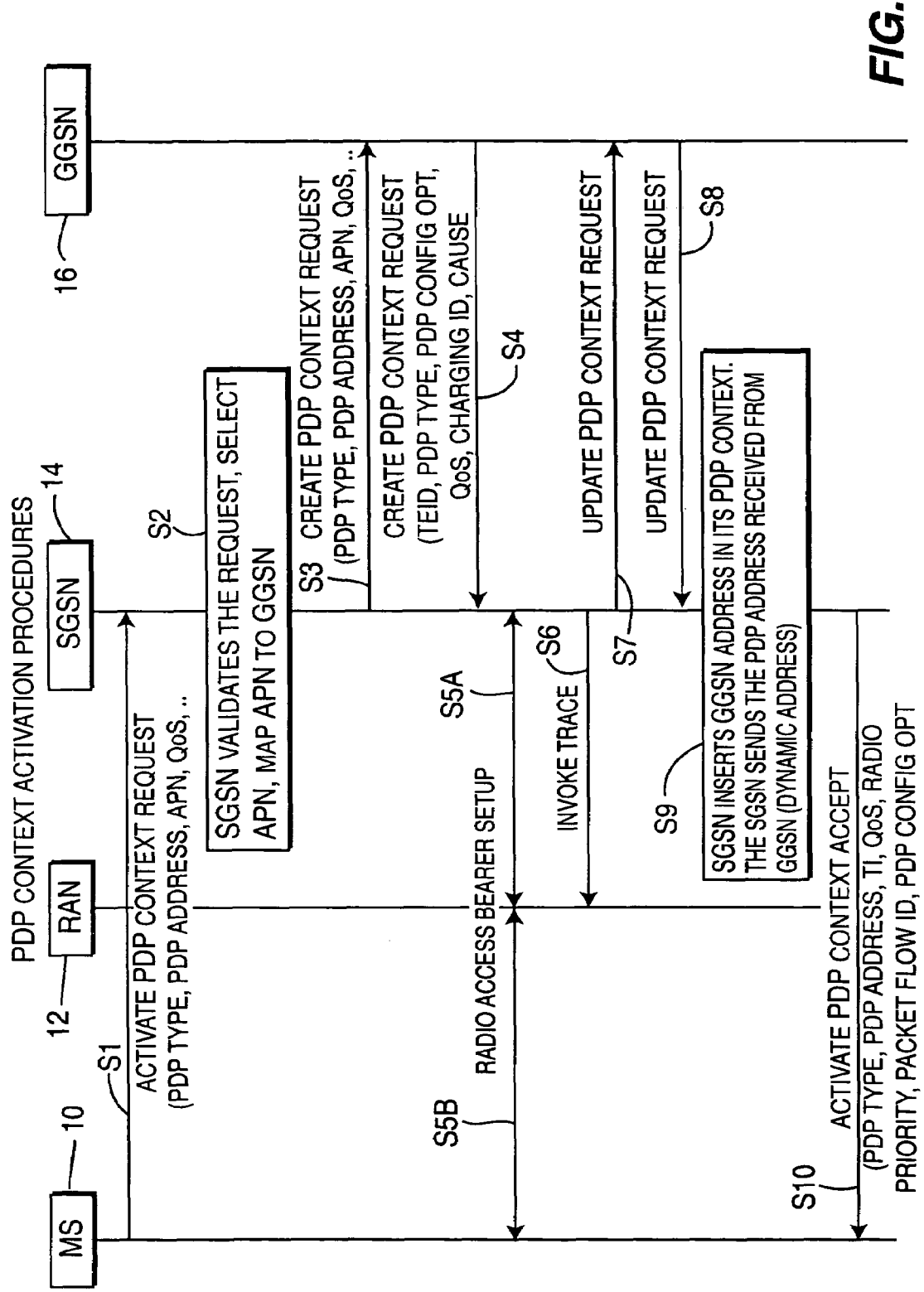
FIG. 1 is a diagram useful in explaining the packet data protocol (PDP) context activation procedure.

FIG. 1 shows a PDP context activation procedure in which the mobile station 10, at step S1, activates a packet data protocol (PDP) context request to SGSN 14, which request includes information such as PDP type, PDP address, access point name (APN), quality of service (QoS) and the like. The APN is used to select a reference point to a certain packet data network and/or to select a service. SGSN 14, at step S2, validates the request, selects the requested APN and maps the APN to a GGSN, such as GGSN 16. Thereafter, the SGSN, at step S3, creates the packet data protocol (PDP) context request which includes the PDP type, the PDP address, the access point name (APN), quality of service (QoS) and the like. GGSN 16 creates the PDP context response including the tunnel endpoint identifier (TEID), PDP address, PDP configuration options, QoS, charging identification and cause, at step S4. At step S5, a radio access bearer (RAB) setup is created between SGSN 14 and radio access network (RAN) 12 (step S5A) and between the mobile station 10 and the radio access network (RAN) 12 (step S5B) utilizing a known RAB assignment procedure. At step S6, SGSN 14 invokes a trace with RAN 12 employing a known procedure.

At step S7, SGSN 14 updates the PDP context request to GGSN 16 and, responsive thereto, GGSN 16 updates the PDP context response, at step S8. SGSN 14, at step S9, inserts the GGSN address into its PDP context and sends the PDP address received from the GGSN 16 to mobile station 10 and activates the PDP context accept at step S10 which includes PDP type, PDP address, TI, QoS, radio priority, packet flow ID and PDP configuration options.

Figure 2:
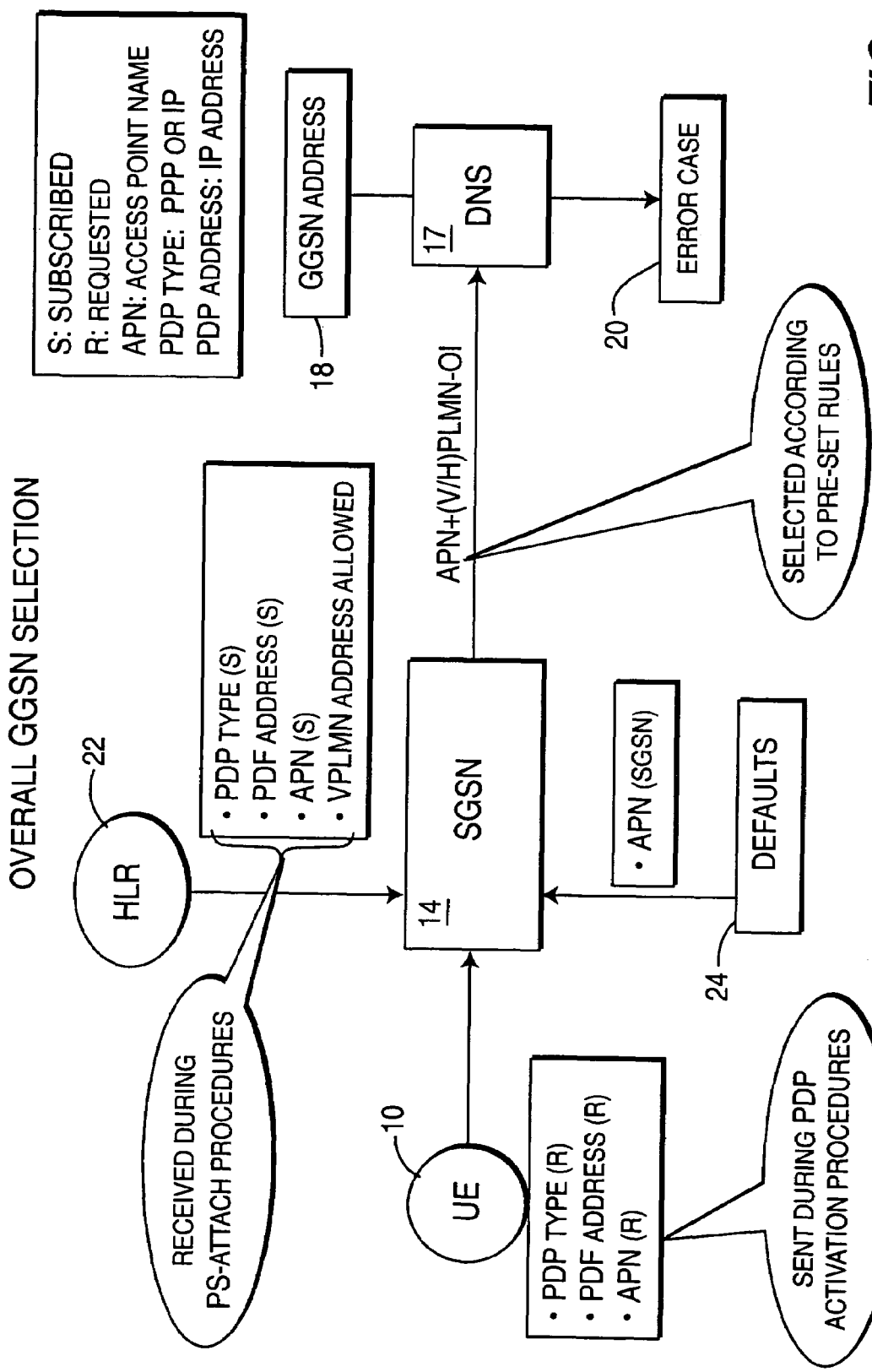
FIG. 2 is a diagram useful in explaining overall GGSN selection.

FIG. 2 is a diagram useful in explaining the overall GGSN selection. The UE 10, also shown as the mobile station in FIG. 1, sends a request including PDP type, PDP address and APN to SGSN 14. The SGSN 14 sends the APN and visited/home public land mobile network (V/H) PLMN-OI to the directory name service (DNS) database 16 which either provides the GGSN address shown at 18 or indicates an error at 20 if there is no associated GGSN.

The SGSN 14 receives from the home location register (HLR) 22 the subscribed: PDP type, PDP address, APN and the visited public land mobile network (VPLMN) address which is allowed. SGSN 14 also receives the SGSN access point name (APN) from defaults 24 provided in software which is hard-coded in SGSN 14.

Figure 3:
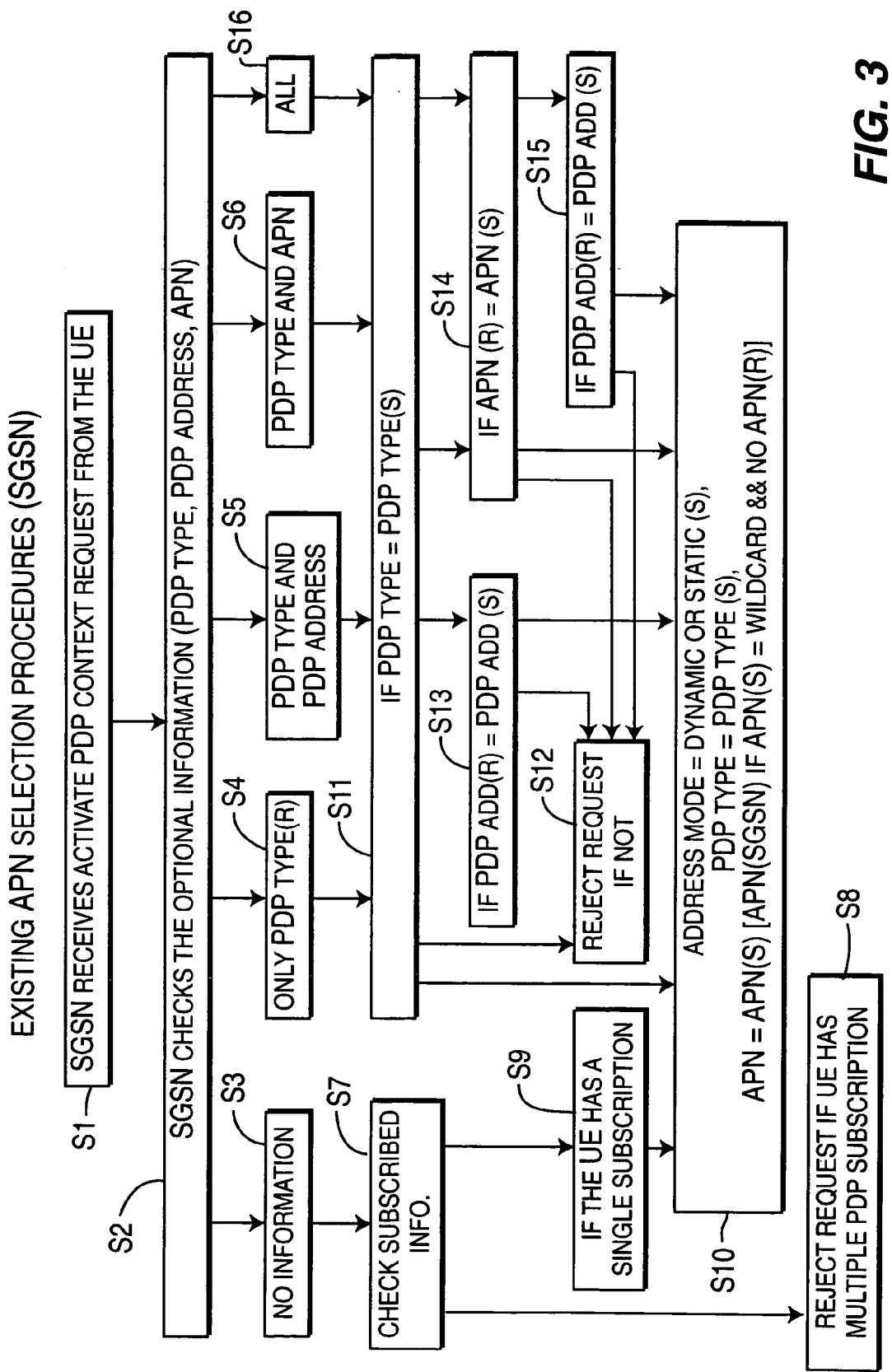
FIG. 3 is a diagram showing the conventional APN selection procedure.

FIG. 3 shows the existing procedure for APN selection wherein, at step S1, the SGSN receives an activate PDP context request from the UE (note, for example UE 10 in FIG. 2). At step S2, the SGSN checks the optional information which includes PDP type, PDP address and APN. If there is no information, at step S3, the SGSN, which branches to step S7, checks the subscribed information and, at step S8, rejects the request if the UE has multiple PDP subscriptions since only one PDP type can be designated. Alternatively, after performing the checking step S7, at step S9, if the checking step indicates that the UE has a single subscription, the SGSN, branches to step S10 and provides subscribed information which includes the address mode, either dynamic or static, the PDP type and the subscribed APN of the SGSN if the subscribed APN is a wildcard and there is no APN request. WILDCARD=means that Any Name can be used without causing any problems.

Returning to step S2, if there is only a PDP type request, determined at step S4 and if the PDP type compares with the subscribed PDP type, determined at step S11 the routine jumps to step S10 wherein the SGSN provides the same information as set forth above and as shown in step S10.

Returning to step S11, if the PDP type is not the subscribed PDP type the routine branches to step S12, causing the request to be rejected by the SGSN.

Again returning to step S11, if the PDP type is the subscribed PDP type and the PDP add request (PDP ADD (R)) is the same as the PDP add subscribed, determined at step S13, the SGSN provides the data shown at step S10. However, returning to step S13, if the PDP add request (PDP ADD(R)) is not the same as the PDP add subscribed, the routine branches to step S12 wherein the request is rejected. (R) here means Requested by the UE. It may or may not be honored by the network depending on the subscription information in the HLR.

Again returning to step S11, if the PDP type is the same as the PDP type subscribed and, as determined at step S14, if the APN request is the same as the APN subscribed, the SGSN branches to step S10 providing the information set forth therein. However, if the APN request is not the same as the APN subscribed, the routine branches to step S12 in which the request is rejected.

Returning to step S2, if the PDP type request, the PDP type the PDP address and the APN are all present, the program, at step S16, branches to step S11 to determine if the PDP type is the same as the PDP type subscribed. If so, the program branches to step S14 wherein, if the APN requested is the same as the APN subscribed, the SGSN provides the information shown in step S10. If the APN requested is not the same as the APN subscribed, the routine branches to step S12 wherein the request is rejected.

Returning to step S14, if the APN request is the same as the APN subscribed the routine branches to step S15 wherein, if the PDP add request is the same as the PDP add subscribed, the SGSN provides the information set forth at step S10. Alternatively, if the PDP add request (PDP ADD (R)) is not the same as the PDP add subscribed, the routine branches to step S12 in which the request is rejected.

Figure 4:
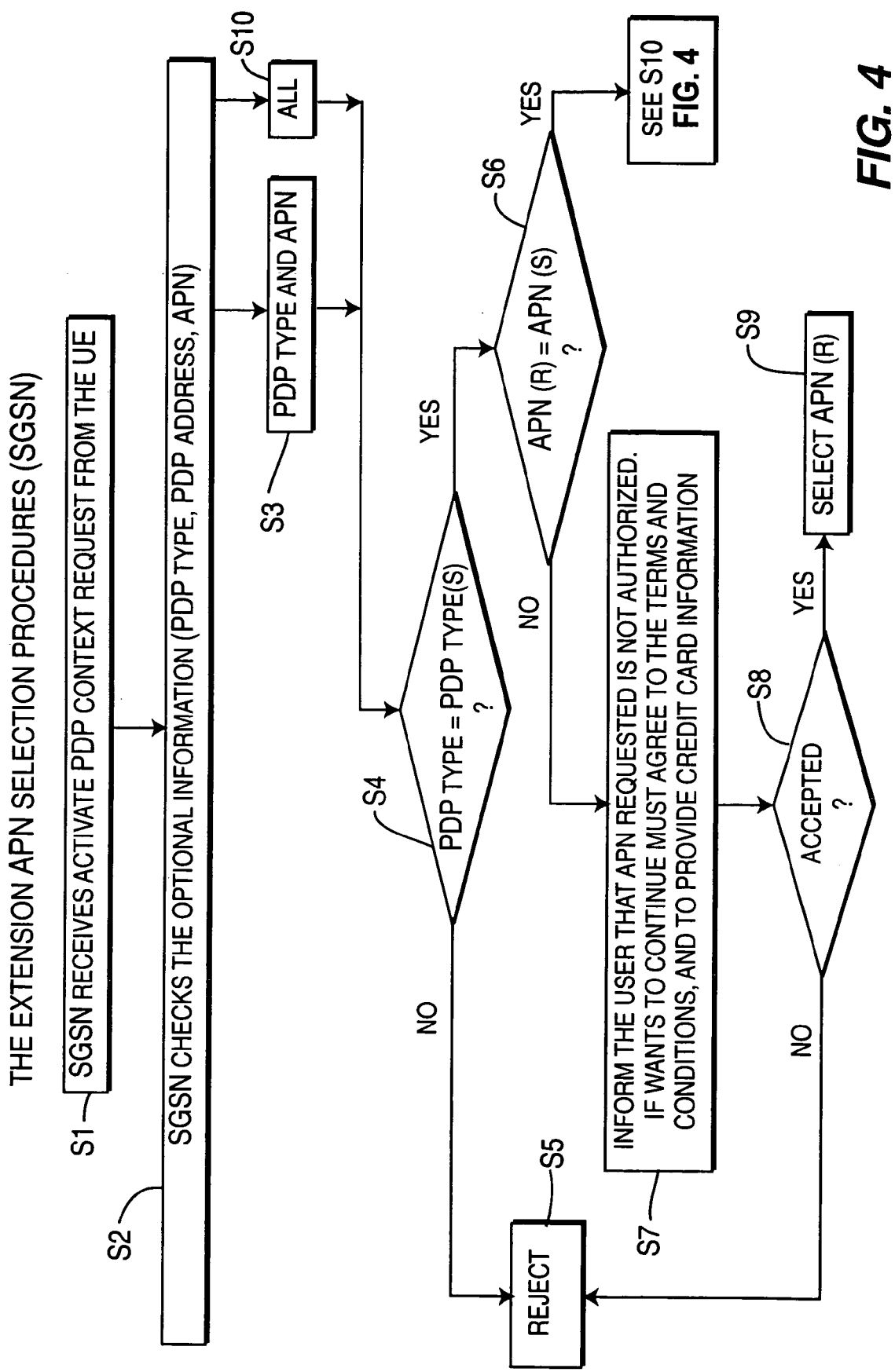
FIG. 4 is a diagram showing the APN selection procedures (SGSN) of the present invention.

FIG. 4 shows the extended APN selection procedure in accordance with the present invention wherein, when the SGSN, at step S1 receives the activate PDP context request from the UE 10 (see FIGS. 1 and 2), the SGSN, at step S2, checks the optional information such as PDP type, PDP address and APN. If only the PDP type and APN are present, at step S3, the routine branches to step S4 to determine if the PDP type is the subscribed PDP type. If not, the routine branches to step S5, rejecting the request. If the PDP type is the same as the subscribed PDP type, the routine branches to step S5 to examine the APN. If the requested APN is the same as the subscribed APN, the routine branches to provide the same information shown at step S10 in FIG. 3.

If the APN requested and the APN subscribed are not the same, the routine branches to step S7 to inform the user that the APN requested is not authorized and that if the UE (mobile station) wants to continue, the UE must agree to the terms and conditions and provide credit (or debit) card or like information.

The SGSN, at step S8 examines the UE response and, if the terms and conditions are accepted, the routine branches to step S9 wherein the requested APN is selected. If the UE does not accept the terms and conditions, the routine branches to step S5 wherein the SGSN rejects the request.

Returning to step S2, when the PDP type, PDP address and APN are all present, the routine branches to step S10 wherein steps S4 and S6 are repeated and, dependent upon the results of these comparisons, the routine branches to either steps S5, S7 or S10 of FIG. 3, the remainder of the routine being the same as described hereinabove for the case where only PDP type and APN are provided to the SGSN by the UE, shown in step S3 in FIG. 4.

What is claimed is:

1. A method employed by a serving general packet radio service (GPRS) support node (SGSN), said method comprising:
   a) receiving a request for a packet data protocol (PDP) type and an access point name (APN);
   b) comparing the PDP type and APN request with subscribed information; and
   c) creating a message that the APN requested is not authorized without agreement to the terms and conditions and consent to charges to access the requested APN when the PDP type is the same as the PDP type subscribed and when the APN requested is not the same as the APN subscribed.

2. The method of claim 1, wherein step (c) further comprises:
   (d) providing the requested APN when the PDP type is the PDP type subscribed and the
APN subscribed is the same as the APN requested.

3. The method of claim 1, further comprising:
   (d) providing the requested APN upon receipt of a communication that the terms and conditions of step (c) have been accepted.

4. The method of claim 1, further comprising:
   (d) rejecting the PDP request when the subscribed PDP type is not the same as the requested PDP type.

5. The method of claim 1, further comprising:
   (d) rejecting APN upon receipt of a communication that the terms and conditions of step (c) have not been accepted.

6. A method employed by serving general packet radio service (GPRS) support node (SGSN), said method comprising:
   a) receiving a request for a packet data protocol (PDP), PDP address type and an access point name (APN);
   b) comparing the PDP type and APN request with subscribed information; and
   c) generating a message that the APN requested is not authorized without an agreement to the terms and conditions and consent to charges to access the requested APN when the PDP type is the same as the PDP type subscribed and when the APN requested is not the same as the APN subscribed.

7. The method of claim 6, further comprising:
   (d) providing the requested APN when the PDP type is the PDP type subscribed and when the APN subscribed is the same as the APN requested.

8. The method of claim 6, further comprising:
   (d) rejecting the request for the PDP type when the subscribed PDP type is not the same as the requested PDP type.

9. The method of claim 6, further comprising:
   (d) providing the requested APN upon receipt of a communication that the terms and conditions of step (c) have been accepted.

10. The method of claim 6, further comprising:

(d) rejecting the requested APN, upon receipt of a communication that the terms and conditions of step (c) have not been accepted.

11. Apparatus for use by a serving general packet radio service (GPRS) support node (SGSN), said SGSN comprising:

a unit configured to receive a packet data protocol (PDP) type and an access point name (APN).

a comparator for comparing the PDP type and APN request with subscribed information;

a unit configured to generate a message that the APN requested is not authorized without acceptance of the terms and conditions and consent to charges to access the requested APN when the PDP type is the same as the PDP type subscribed and when the APN requested is not the same as the APN subscribed.

12. The apparatus of claim 11, further comprising:

a unit configured to provide the requested APN when the PDP type is the PDP type subscribed and the APN subscribed is the same as the APN requested.

13. The apparatus of claim 11, further comprising:

a unit configured to provide the requested APN upon receipt of a communication that the terms and conditions of step (c) have been accepted.

14. The apparatus of claim 13 wherein the unit configured to provide the requested APN is further configured to provide the requested APN when the PDP type is the PDP type subscribed and when the APN subscribed is the same as the APN requested.

15. The apparatus of claim 11 wherein the SGSN further comprises:

a unit configured to reject the request for the PDP type when the subscribed PDP type is not the same as the requested PDP type.

16. The apparatus of claim 11, further comprising:

a unit configured to reject the requested APN upon receipt of a communication that the terms and conditions have not been accepted.

* * * * *

UNITED STATES PATENT AND TRADEMARK OFFICE
CERTIFICATE OF CORRECTION

PATENT NO. : 7,386,301 B2 Page 1 of 1
APPLICATION NO. : 11/228619
DATED : June 10, 2008
INVENTOR(S) : Kamel M. Shaheen It is certified that error appears in the above-identified patent and that said Letters Patent is hereby corrected as shown below:

ON THE FACE PAGE

At section (56), U.S. PATENT DOCUMENTS, page 1, right column, delete line beginning with "2003/0103206" and insert therefor --2003/0103506  A1  6/2003  Keller--.

At section (56), FOREIGN PATENT DOCUMENTS, page 1, right column, after line beginning with "JP 2001-508276" insert --JP 2002-142249  5/2002--.

IN THE SPECIFICATION

At column 1, line 19, before the word "list" delete "subscribers" and insert therefore --subscriber's--.

At column 2, line 44, before the word "which" delete "16" and insert therefore --17--.

At column 3, line 29, after the word "type" insert --,--.

Signed and Sealed this

Seventeenth Day of March, 2009

JOHN DOLL
*Acting Director of the United States Patent and Trademark Office*